United States Patent
Liu et al.

(10) Patent No.: US 11,490,288 B2
(45) Date of Patent: Nov. 1, 2022

(54) PROCESSING METHOD OF ADAPTATION LAYER OF INTEGRATED ACCESS AND BACKHAUL NODE AND ADAPTATION LAYER

(71) Applicants: China Mobile Communication Co., Ltd Research Institute, Beijing (CN); China Mobile Communications Group Co., Ltd., Beijing (CN)

(72) Inventors: Liang Liu, Beijing (CN); Hui Ma, Beijing (CN); Zhuo Chen, Beijing (CN)

(73) Assignees: China Mobile Communication Co., Ltd Research Institute, Beijing (CN); China Mobile Communications Group Co., Ltd., Beijing (CN)

( * ) Notice: Subject to any disclaimer, the term of this patent is extended or adjusted under 35 U.S.C. 154(b) by 52 days.

(21) Appl. No.: 17/057,210

(22) PCT Filed: Apr. 29, 2019

(86) PCT No.: PCT/CN2019/084910
§ 371 (c)(1),
(2) Date: Nov. 20, 2020

(87) PCT Pub. No.: WO2019/223500
PCT Pub. Date: Nov. 28, 2019

(65) Prior Publication Data
US 2021/0219180 A1    Jul. 15, 2021

(30) Foreign Application Priority Data
May 21, 2018    (CN) .......................... 201810491231.5

(51) Int. Cl.
*H04W 4/00*        (2018.01)
*H04W 28/08*    (2009.01)
(Continued)

(52) U.S. Cl.
CPC ............... *H04W 28/08* (2013.01); *H04L 9/40* (2022.05); *H04L 69/03* (2013.01); *H04W 16/18* (2013.01); *H04W 84/047* (2013.01)

(58) Field of Classification Search
CPC .......... H04W 4/18; H04W 4/50; H04W 8/00; H04W 8/005; H04W 8/183; H04W 8/20;
(Continued)

(56) References Cited

U.S. PATENT DOCUMENTS

| | | |
|---|---|---|
| 2011/0194483 A1 | 8/2011 | Ji et al. |
| 2011/0305458 A1 | 12/2011 | Zhou et al. |
| 2019/0223078 A1* | 7/2019 | Sirotkin ................ H04B 7/155 |

FOREIGN PATENT DOCUMENTS

| | | |
|---|---|---|
| CN | 101815229 A | 8/2010 |
| CN | 102474770 A | 5/2012 |

(Continued)

OTHER PUBLICATIONS

"3rd Generation Partnership Project; Technical Specification Group Radio Access Network; Study on Integrated Access and Backhaul; (Release 15)", 3GPP Draft;TR 38.874 V021 TRCH, 3rd Generation Partnership Project (3GPP), Mobile Competence Centre; 650, Route Des Lucioles; F-06921 Sophia-Antipolis Cedes; France.

(Continued)

*Primary Examiner* — Huy C Ho
(74) *Attorney, Agent, or Firm* — Price Heneveld LLP

(57) ABSTRACT

A processing method of an adaptation layer of an integrated access and backhaul node and an adaptation layer are provided. The method includes: mapping, by the adaptation layer of the integrated access and backhaul node, a received first data packet to a first bearer or channel between the integrated access and backhaul node and a first node; transmitting, by the adaptation layer of the integrated access and backhaul node, the first data packet to the first node;
(Continued)

US 11,490,288 B2
Page 2 wherein the first node is a downstream integrated access and backhaul node relative to the integrated access and backhaul node and/or a UE accessing the integrated access and backhaul node, or the first node is an upstream integrated access and backhaul node relative to the integrated access and backhaul node or a donor node of the integrated access and backhaul node.

18 Claims, 8 Drawing Sheets

(51) Int. Cl.
*H04L 69/00* (2022.01)
*H04W 16/18* (2009.01)
*H04W 84/04* (2009.01)
*H04L 9/40* (2022.01)

(58) Field of Classification Search
CPC ....... H04W 8/205; H04W 8/24; H04W 8/245; H04W 16/02; H04W 16/04; H04W 16/06; H04W 28/00; H04W 28/0205; H04W 28/0268; H04W 28/0273; H04W 28/10; H04W 28/12; H04W 28/18; H04W 28/20; H04W 28/22; H04W 28/24; H04W 28/26; H04W 40/00; H04W 40/005; H04W 40/02; H04W 48/00; H04W 48/02; H04W 48/06; H04W 48/08; H04W 48/12; H04W 48/16; H04W 48/17; H04W 48/18; H04W 48/20; H04W 80/02; H04W 80/04; H04W 80/045; H04W 80/06; H04W 80/08; H04W 80/085; H04W 80/10; H04W 80/12
USPC ....................................................... 370/329
See application file for complete search history.

(56) References Cited

FOREIGN PATENT DOCUMENTS

| CN | 107205267 A | 9/2017 |
| CN | 107249202 A | 10/2017 |

OTHER PUBLICATIONS

ZTE: "Considerations on Adaption Layer in IAB", 3GPP Draft; R3-182788—Considerations on Adaption Layer in IAB, 3rd Generation Partnership Project (3GPP), Mobile Competence Centre; 650, Route Des Lucioles; F-06921 Sophia-Antipolis Cedes; France.
Nokia et al:"On Multiplexing with MAC and RLC Adaption Layer for L2 Relaying and TP for 38.874", 3GPP Draft; R2-1807728 on Multiplexing with MAC and RLC Adaption Layer for L2 Relaying and TP for 38.874, 3rd Generation Partnership Project (3GPP), Mobile Competence Centre; 650, Route Des Lucioles, vol. RAN WG2, No. Busan, South Korea.
Nokia, Nokia Shanghai Bell, "MAC Adaption vs. RLC Adaption Layer for L2 Relaying", R3-182104, 3GPP TSG-RAN WG3 Meeting #99bis, Apr. 16-20, 2018, Sanya, China.
Huawei, "CP Protocol Design for L2 Relaying", R3-183183, 3GPP TSG-RAN WG3 Meeting #100, May 21-25, 2018, Busan, Korea.

* cited by examiner

PROCESSING METHOD OF ADAPTATION LAYER OF INTEGRATED ACCESS AND BACKHAUL NODE AND ADAPTATION LAYER

CROSS-REFERENCE TO RELATED APPLICATION

This application is a U.S. national phase application of a PCT Application No. PCT/CN2019/084910 filed on Apr. 29, 2019, which claims a priority to the Chinese patent application No. 201810491231.5 filed in China on May 21, 2018, a disclosure of which is incorporated herein by reference in its entirety.

TECHNICAL FIELD

Embodiments of the present disclosure relate to the field of communications technologies, and specifically, relates to a processing method of an adaptation layer of an integrated access and backhaul node and an adaptation layer of an integrated access and backhaul node.

BACKGROUND

Relay technology has attracted attention in the field of wireless communication for its capability of increasing coverage, increasing capacity, reducing a transmission power, and a flexible and rapid deployment. A relay-based architecture and a relay-based process are defined in a Long Term Evolution (LTE) of fourth generation (4G) mobile communications by a 3rd Generation Partnership Project (3GPP).

In future fifth generation (5G) mobile communication systems, mobile communication will exist in a form of ultra-dense network deployment, which may be impossible to guarantee that each base station node has a limited backhaul connection to a core network. In this case, wireless backhaul and relay technology will become very promising technologies. On the other hand, the 5G system will use a frequency with a larger bandwidth (such as a millimeter wave) than LTE, along with large-scale antennas and multi-beam technology, making application of Integrated and Access Backhaul (IAB) be possible, as shown in FIG. 1.

Research work on 5G Integrated and Access Backhaul (IAB) is being carried out in 3GPP, and an IAB framework is shown in FIG. 2.

Architecture of the IAB may be divided into the following two categories: L2 relay and L3 relay. A L3 relay architecture is similar to a standardized relay architecture in LTE. The L2 relay designs a newly defined Centralized Unit-Distributed Unit (CU-DU) architecture in the 5G, therefore more discussions are given thereon. A typical L2 relay architecture is shown in FIG. 3.

It may be seen from FIG. 2 that an IAB node does not have a complete protocol stack, but only has a function of a DU. A F1 backhaul of a relay node is carried on a New Radio (NR) air-interface link of a wireless backhaul, and an adaptation layer is required to transmit the F1 backhaul among multi-level IAB nodes. However, what function the adaptation layer has in the related art is a question that remains to be studied.

SUMMARY

An objective of embodiments of the present disclosure is to provide a processing method of an adaptation layer of an integrated access and backhaul node and an adaptation layer, so as to solve a problem of definition of a function of an adaptation layer of an integrated access and backhaul node.

In a first aspect, a processing method of an adaptation layer of an integrated access and backhaul node is provided. The adaptation layer of the integrated access and backhaul node determines a first node to which a received first data packet is to be transmitted; the adaptation layer of the integrated access and backhaul node maps the first data packet to a first bearer or channel between the integrated access and backhaul node and the first node; the first node is one or more downstream integrated access and backhaul nodes relative to the integrated access and backhaul node or a UE accessing the integrated access and backhaul node; or, the first node is one or more upstream integrated access and backhaul nodes relative to the integrated access and backhaul node or a donor node of the integrated access and backhaul node.

Optionally, the processing method of the adaptation layer of the integrated access and backhaul node further includes: recovering, by the adaptation layer of the integrated access and backhaul node according to received data and a received serial number, data transmitted by a second node, wherein, the second node is one or more downstream integrated access and backhaul nodes relative to the integrated access and backhaul node or a UE accessing the integrated access and backhaul node; or, the second node is one or more upstream integrated access and backhaul nodes relative to the integrated access and backhaul node or a donor node of the integrated access and backhaul node.

Optionally, the serial number is configured by an adaptation layer of the second node, or the serial number is a reused Protocol Data Unit (PDU) serial number in a Packet Data Convergence Protocol (PDCP) PDU transmitted by the UE.

Optionally, header information of the adaptation layer of the integrated access and backhaul node includes one or more of following combinations: (1) a first mapping relationship between a bearer or channel of the integrated access and backhaul node and a bearer or channel of a downstream integrated access and backhaul node relative to the integrated access and backhaul node and/or a bearer or channel of the UE; (2) a second mapping relationship between a bearer or channel of the integrated access and backhaul node and a bearer or channel of an upstream integrated access and backhaul node relative to the integrated access and backhaul node and/or a bearer or channel of a donor node of the integrated access and backhaul node; (3) a UE identity; (4) a bearer identity or channel identity; (5) Quality of Service (QoS) information of a bearer or channel; and (6) routing information.

In a second aspect, a transmission method of an integrated access and backhaul node is further provided, the method includes: receiving, by the integrated access and backhaul node, at least one second data packet transmitted by one or more second nodes; determining, by the integrated access and backhaul node, a third data packet according to the second data packet; determining, by the integrated access and backhaul node, a second bearer or channel between the integrated access and backhaul node and a third node; transmitting, by the integrated access and backhaul node, the third data packet to the third node over the second bearer or channel. The second node is a downstream integrated access and backhaul node relative to the integrated access and backhaul node and/or a UE accessing the integrated access and backhaul node, the third node is an upstream integrated access and backhaul node relative to the integrated access and backhaul node or a donor node of the integrated access and backhaul node; or, the second node is an upstream integrated access and backhaul node relative to the integrated access and backhaul node or a donor node of the integrated access and backhaul node, the third node is a downstream integrated access and backhaul node relative to the integrated access and backhaul node and/or a UE accessing the integrated access and backhaul node.

Optionally, determining, by the integrated access and backhaul node, the second bearer or channel between the integrated access and backhaul node and the third node includes: determining, by the integrated access and backhaul node, the second bearer or channel between the integrated access and backhaul node and the third node according to Quality of Service (QoS) information of a bearer or channel of one or more UEs.

Optionally, the second data packet includes: a fourth data packet and a fifth data packet, wherein the fourth data packet is transmitted by an upstream integrated access and backhaul node relative to the second node or a donor node of the second node or a downstream integrated access and backhaul node relative to the second node, the fifth data packet is transmitted by a UE accessing the second node; determining, by the integrated access and backhaul node, the third data packet according to the second data packet includes: recovering, by the integrated access and backhaul node, the fourth data packet and a sixth data packet according to the second data packet, and mapping, by the integrated access and backhaul node, the fourth data packet and the sixth data packet to the third data packet; or, recovering, by the integrated access and backhaul node, the fourth data packet, the fifth data packet and the sixth data packet according to the second data packet, and mapping, by the integrated access and backhaul node, the fourth data packet, the fifth data packet and the sixth data packet to the third data packet. The sixth data packet is a data packet transmitted by the UE accessing the integrated access and backhaul node.

Optionally, header information of the second data packet or header information of the third data packet includes one or more of following combinations: (1) a first mapping relationship between a bearer or channel of the integrated access and backhaul node and a bearer or channel of a downstream integrated access and backhaul node relative to the integrated access and backhaul node and/or a bearer or channel of the UE; (2) a second mapping relationship between a bearer or channel of the integrated access and backhaul node and a bearer or channel of an upstream integrated access and backhaul node relative to the integrated access and backhaul node and/or a bearer or channel of a donor node of the integrated access and backhaul node; (3) a UE identity; (4) a bearer identity or channel identity; (5) Quality of Service (QoS) information of a bearer or channel; and (6) routing information.

In a third aspect, an adaptation layer of an integrated access and backhaul node is further provided, the adaptation layer of the integrated access and backhaul node includes: a first determination module, used to determine a first node to which a received first data packet is to be transmitted; a first transmission module, used to map the first data packet to a first bearer or channel between the integrated access and backhaul node and the first node.

The first node is one or more downstream integrated access and backhaul nodes relative to the integrated access and backhaul node or a UE accessing the integrated access and backhaul node; or, the first node is one or more upstream integrated access and backhaul nodes relative to the integrated access and backhaul node or a donor node of the integrated access and backhaul node.

Optionally, the adaptation layer of the integrated access and backhaul node further includes: a recovery module, used to recover, according to received data and a received serial number, data transmitted by a second node, wherein, the second node is one or more downstream integrated access and backhaul nodes relative to the integrated access and backhaul node or a UE accessing the integrated access and backhaul node; or, the second node is one or more upstream integrated access and backhaul nodes relative to the integrated access and backhaul node or a donor node of the integrated access and backhaul node.

Optionally, the serial number is configured by an adaptation layer of the second node, or the serial number is a reused PDU serial number in a PDCP PDU transmitted by the UE.

Optionally, header information of the adaptation layer of the integrated access and backhaul node includes one or more of following combinations: (1) a first mapping relationship between a bearer or channel of the integrated access and backhaul node and a bearer or channel of a downstream integrated access and backhaul node relative to the integrated access and backhaul node and/or a bearer or channel of the UE; (2) a second mapping relationship between a bearer or channel of the integrated access and backhaul node and a bearer or channel of an upstream integrated access and backhaul node relative to the integrated access and backhaul node and/or a bearer or channel of a donor node of the integrated access and backhaul node; (3) a UE identity; (4) a bearer identity or channel identity; (5) Quality of Service (QoS) information of a bearer or channel; and (6) routing information.

In a fourth aspect, an integrated access and backhaul node is further provided, the integrated access and backhaul node includes: a first reception module, used to receive at least one second data packet transmitted by one or more second nodes; a second determination module, used to determine a third data packet according to the second data packet; a third determination module, used to determine a second bearer or channel between the integrated access and backhaul node and a third node; a second transmission module, used to transmit the third data packet to the third node over the second bearer or channel.

The second node is a downstream integrated access and backhaul node relative to the integrated access and backhaul node and/or a UE accessing the integrated access and backhaul node, the third node is an upstream integrated access and backhaul node relative to the integrated access and backhaul node or a donor node of the integrated access and backhaul node; or, the second node is an upstream integrated access and backhaul node relative to the integrated access and backhaul node or a donor node of the integrated access and backhaul node, the third node is a downstream integrated access and backhaul node relative to the integrated access and backhaul node and/or a UE accessing the integrated access and backhaul node.

Optionally, determining, by the integrated access and backhaul node, the second bearer or channel between the integrated access and backhaul node and the third node includes: determining, by the integrated access and backhaul node, the second bearer or channel between the integrated access and backhaul node and the third node according to Quality of Service (QoS) information of a bearer or channel of one or more UEs.

Optionally, the second data packet includes: a fourth data packet and a fifth data packet, wherein the fourth data packet is transmitted by an upstream integrated access and backhaul node relative to the second node, or a donor node of the second node, or a downstream integrated access and backhaul node relative to the second node, the fifth data packet is transmitted by a UE accessing the second node; the second determination module is further used to recover the fourth data packet and a sixth data packet according to the second data packet, map the fourth data packet and the sixth data packet to the third data packet; or recover the fourth data packet, the fifth data packet and the sixth data packet according to the second data packet, map the fourth data packet, the fifth data packet and the sixth data packet to the third data packet. The sixth data packet is a data packet transmitted by the UE accessing the integrated access and backhaul node.

Optionally, header information of the second data packet or header information of the third data packet includes one or more of following combinations: (1) a first mapping relationship between a bearer or channel of the integrated access and backhaul node and a bearer or channel of a downstream integrated access and backhaul node relative to the integrated access and backhaul node and/or a bearer or channel of the UE; (2) a second mapping relationship between a bearer or channel of the integrated access and backhaul node and a bearer or channel of an upstream integrated access and backhaul node relative to the integrated access and backhaul node and/or a bearer or channel of a donor node of the integrated access and backhaul node; (3) a UE identity; (4) a bearer identity or channel identity; (5) Quality of Service (QoS) information of a bearer or channel; and (6) routing information.

In a fifth aspect, a communication device is further provided, the communication device includes: a processor, a storage and a computer program stored on the storage and executed by the processor, wherein when the computer program is executed by the processor, the processor implements the steps of the processing method of the adaptation layer of the integrated access and backhaul node described in the first aspect, or implements the steps of the transmission method of the integrated access and backhaul node described in the second aspect.

In a sixth aspect, a computer readable storage medium is further provided, the computer readable storage medium stores therein a computer program, wherein the computer program is executed by a processor to implement the steps of the processing method of the adaptation layer of the integrated access and backhaul node described in the first aspect, or implements the steps of the transmission method of the integrated access and backhaul node described in the second aspect.

In the embodiments of the present disclosure, an end-to-end user plane process in an integrated access and backhaul node may be solved and complexity of implementation is reduced.

BRIEF DESCRIPTION OF THE DRAWINGS

Various other advantages and benefits will become apparent to those of ordinary skills in the art upon reading the detailed description of optional embodiments below. The drawings are only for the purpose of illustrating optional embodiments and are not to be considered as limiting the present disclosure. Moreover, the same reference numerals are used throughout the drawings to refer to the same components. In the drawings.

DETAILED DESCRIPTION

The technical solutions of embodiments of the present disclosure will be clearly and completely described below with reference to the drawings of embodiments of the present disclosure. Apparently, the described embodiments are some embodiments of the present disclosure, but are not all the embodiments. Based on embodiments of the present disclosure, all other embodiments derived by a person of ordinary skill in the art without any creative efforts shall fall within the scope of the present disclosure.

The terms "comprise" and "include" in the specification and the claims of the present application and any variants thereof are intended to cover non-exclusive inclusions, for example, a process, a method, a system, a product, or a device that includes a series of steps or units is not necessarily limited to those steps or units clearly listed, but may include other steps or units not explicitly listed or inherent to such processes, methods, products or devices. In addition, the term "and/or" in the specification and the claims indicates at least one of connected objects, for example, A and/or B may mean these three cases: A exists alone, B exists alone, and A and B exist simultaneously.

In embodiments of the present disclosure, terms such as "exemplary" or "for example" are used to represent examples, illustrations, or explanations. In embodiments of the present disclosure, any embodiment or design solution described as being "exemplary" or "for example" should not be construed as being more optional or advantageous than other embodiments or design solutions. Rather, use of terms such as "illustrative" or "for example" is intended to present related concepts in a specific manner.

Figure 1:
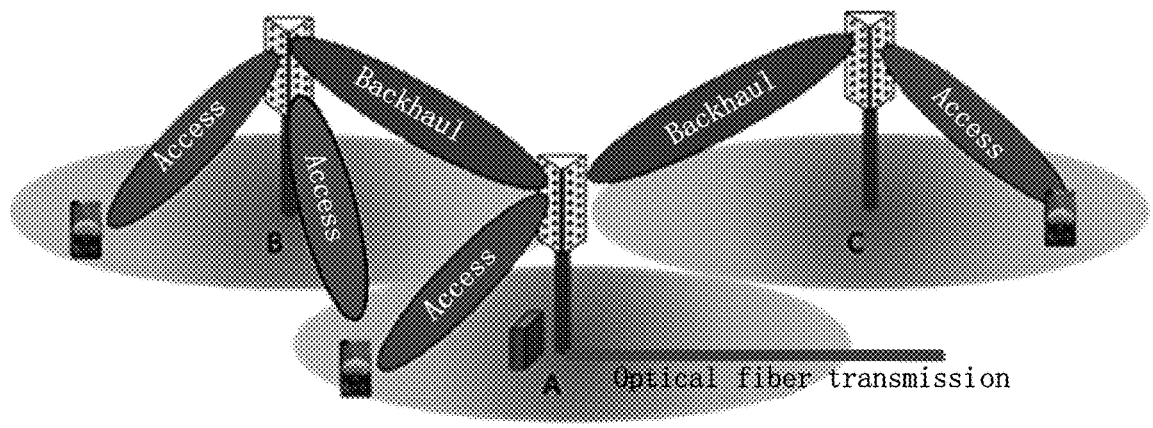
FIG. 1 is a schematic diagram of an integrated and access backhaul.
Figure 2:
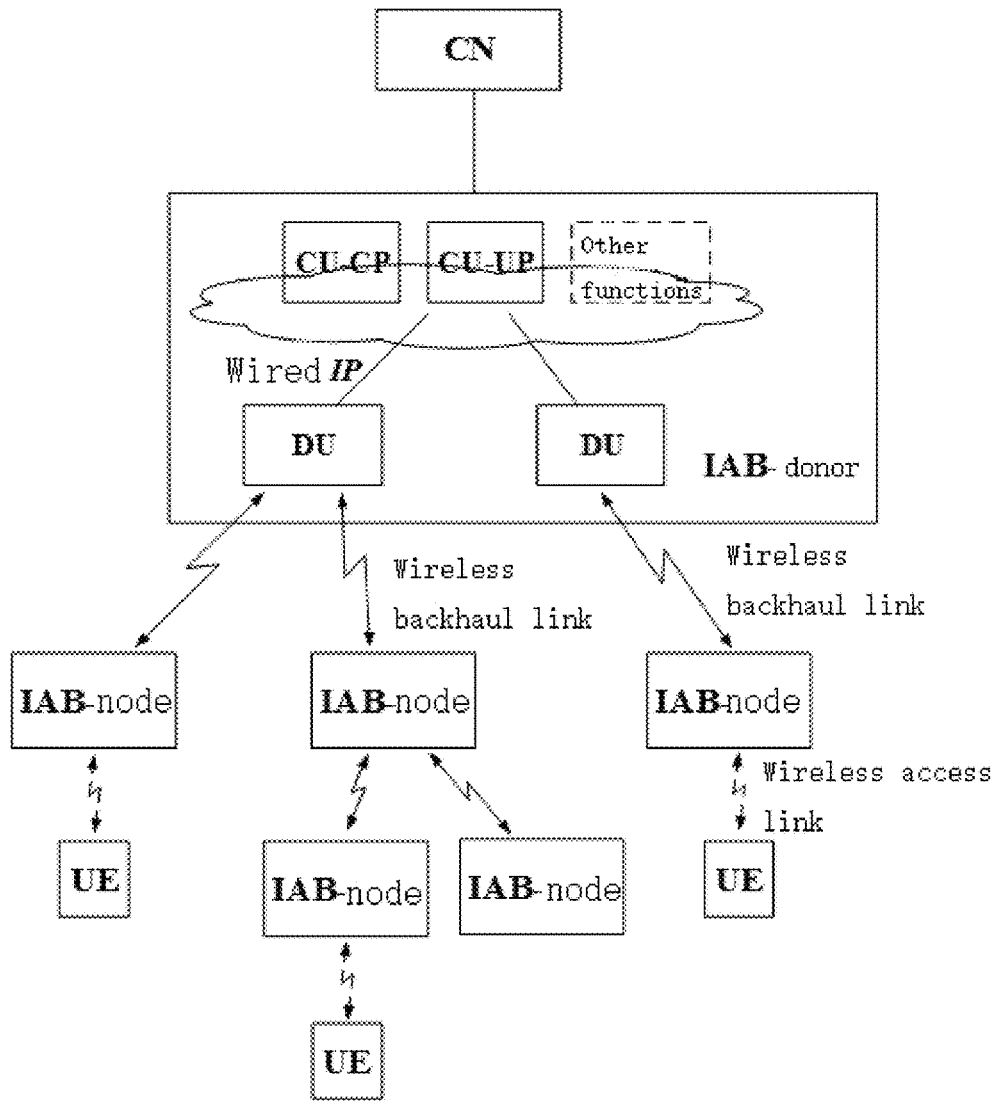
FIG. 2 is a schematic diagram of an IAB framework.
Figure 3:
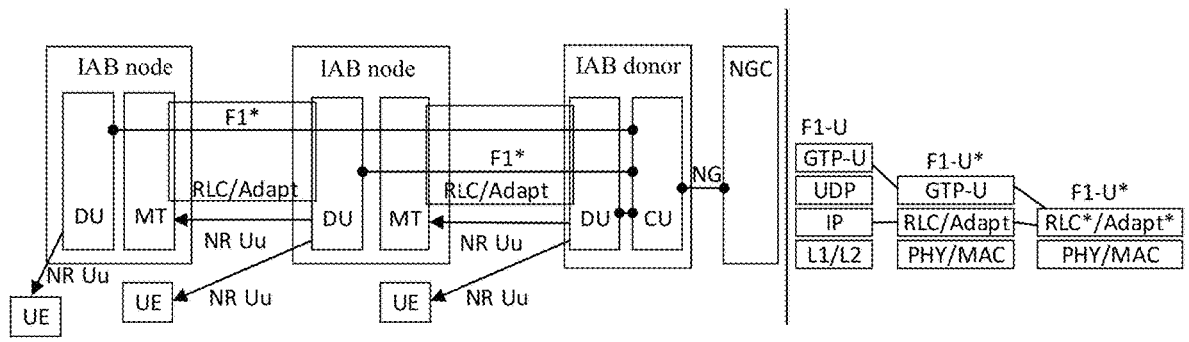
FIG. 3 is a schematic diagram of IAB architecture based on a L2 relay.
Figure 4:
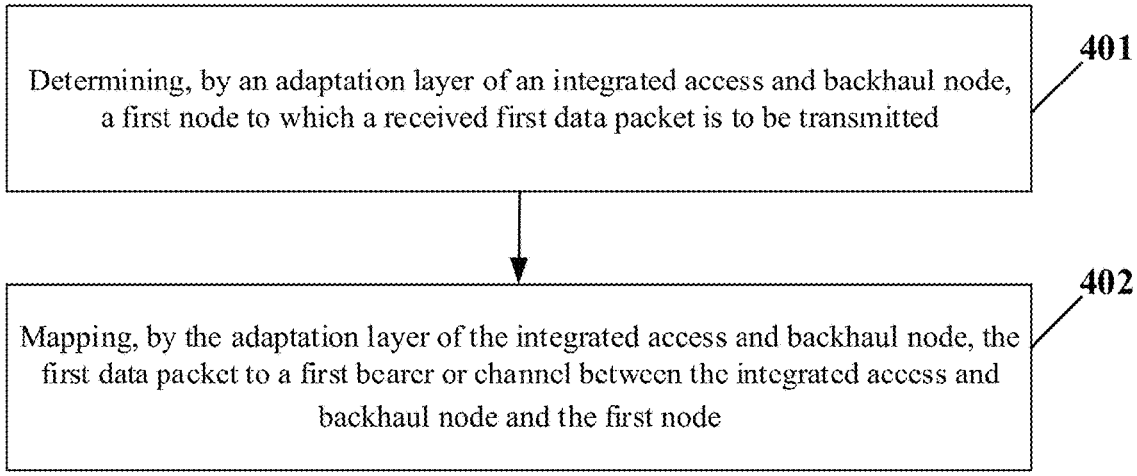
FIG. 4 is a flowchart of a processing method of an adaptation layer of an integrated access and backhaul node according to an embodiment of the present disclosure.

Referring to FIG. 4, a flowchart of a processing method of an adaptation layer of an integrated access and backhaul node according to an embodiment of the present disclosure is illustrated, an execution entity of the method is an adaptation layer of an integrated access and backhaul node, and specific steps are as follows.

Step 401: determining, by the adaptation layer of the integrated access and backhaul node, a first node to which a received first data packet is to be transmitted.

Step 402: mapping, by the adaptation layer of the integrated access and backhaul node, the first data packet to a first bearer or channel between the integrated access and backhaul node and the first node.

The first node is one or more downstream integrated access and backhaul nodes relative to the integrated access and backhaul node or a UE accessing the integrated access and backhaul node; or, the first node is one or more upstream integrated access and backhaul nodes relative to the integrated access and backhaul node or a donor node of the integrated access and backhaul node.

In an embodiment of the present disclosure, the adaptation layer of the integrated access and backhaul node has functions of mapping routing and recovering data.

In an embodiment of the present disclosure, optionally, the method further includes: recovering, by the adaptation layer of the integrated access and backhaul node, data transmitted by a second node according to received data and a received serial number, wherein, the second node is one or more downstream integrated access and backhaul nodes relative to the integrated access and backhaul node or a UE accessing the integrated access and backhaul node; or, the second node is an upstream integrated access and backhaul node relative to the integrated access and backhaul node or a donor node of the integrated access and backhaul node.

In an embodiment of the present disclosure, optionally, the serial number is configured by an adaptation layer of the second node, or the serial number is a reused a Protocol Data Unit (PDU) serial number in a Packet Data Convergence Protocol (PDCP) PDU transmitted by the UE.

In an embodiment of the present disclosure, header information of the adaptation layer of the integrated access and backhaul node includes one or more of following combinations: (1) a first mapping relationship between a bearer or channel of the integrated access and backhaul node and a bearer or channel of a downstream integrated access and backhaul node relative to the integrated access and backhaul node and/or a bearer or channel of the UE; (2) a second mapping relationship between a bearer or channel of the integrated access and backhaul node and a bearer or channel of an upstream integrated access and backhaul node relative to the integrated access and backhaul node and/or a bearer or channel of a donor node of the integrated access and backhaul node; (3) a UE identity; (4) an identity of a bearer (or a data radio bearer) or channel; (5) Quality of Service (QoS) information of a bearer or channel; and (6) routing information.

In an embodiment of the present disclosure, an end-to-end user plane process in an integrated access and backhaul node is solved and complexity of implementation is reduced.

Figure 5:
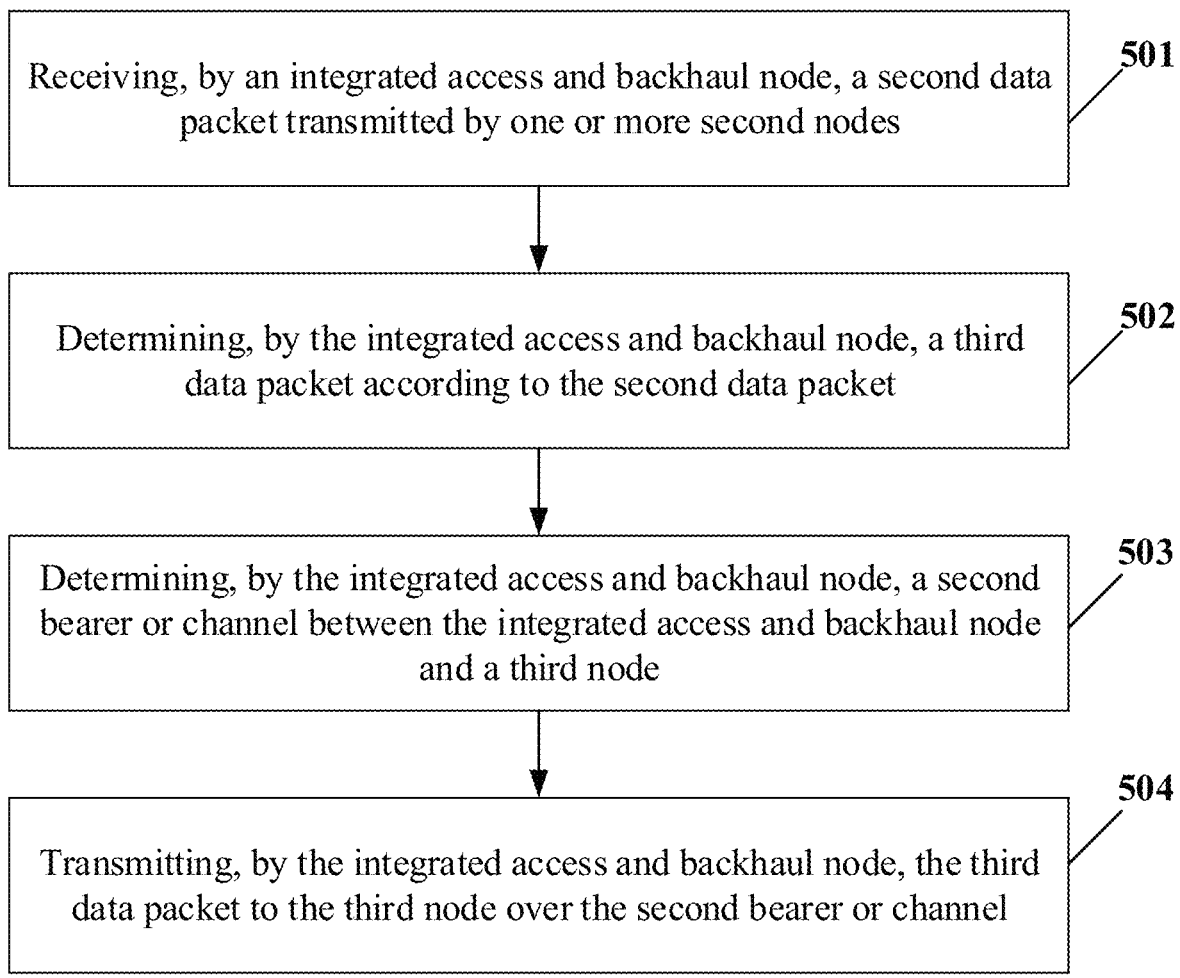
FIG. 5 is a second flowchart of a transmission method of an integrated access and backhaul node according to an embodiment of the present disclosure.

Referring to FIG. 5, a flowchart of a transmission method of an integrated access and backhaul node according to an embodiment of the present disclosure is illustrated, an execution entity of the method is an integrated access and backhaul node, and specific steps are as follows.

Step 501: receiving, by the integrated access and backhaul node, a second data packet transmitted by one or more second nodes.

In an embodiment of the present disclosure, optionally, the integrated access and backhaul node receives multiple second data units and serial numbers of multiple first data units in the second data packet from the second node; the integrated access and backhaul node acquires, according to the multiple first data units and the serial numbers, the second data packet transmitted by the second node.

Further, the serial numbers may be configured by an adaptation layer of the second node, or the serial numbers is a reused a Protocol Data Unit (PDU) serial number in a Packet Data Convergence Protocol (PDCP) PDU transmitted by the UE.

Step 502: determining, by the integrated access and backhaul node, a third data packet according to the second data packet.

Step 503: determining, by the integrated access and backhaul node, a second bearer or channel between the integrated access and backhaul node and a third node.

In an embodiment of the present disclosure, the integrated access and backhaul node determines the second bearer or channel between the integrated access and backhaul node and the third node according to QoS information of bearers of one or more UEs.

Step 504: transmitting, by the integrated access and backhaul node, the third data packet to the third node over the second bearer or channel.

In an embodiment of the present disclosure, optionally, the second node is a downstream integrated access and backhaul node relative to the integrated access and backhaul node and/or a UE accessing the integrated access and backhaul node, the third node is an upstream integrated access and backhaul node relative to the integrated access and backhaul node or a donor node of the integrated access and backhaul node.

In an embodiment of the present disclosure, optionally, the second node is an upstream integrated access and backhaul node relative to the integrated access and backhaul node or a donor node of the integrated access and backhaul node, the third node is a downstream integrated access and backhaul node relative to the integrated access and backhaul node and/or a UE accessing the integrated access and backhaul node.

In an embodiment of the present disclosure, optionally, the second data packet may include: a fourth data packet and a fifth data packet, wherein the fourth data packet is transmitted by an upstream integrated access and backhaul node relative to the second node or a donor node of the second node or a downstream integrated access and backhaul node relative to the second node, the fifth data packet is transmitted by a UE accessing the second node.

Determining, by the integrated access and backhaul node, the third data packet according to the second data packet includes: (1) recovering, by the integrated access and backhaul node, the fourth data packet and a sixth data packet according to the second data packet, and mapping, by the integrated access and backhaul node, the fourth data packet and the sixth data packet to the third data packet; or, (2) recovering, by the integrated access and backhaul node, the fourth data packet, the fifth data packet and the sixth data packet according to the second data packet, and mapping, by the integrated access and backhaul node, the fourth data packet, the fifth data packet and the sixth data packet to the third data packet; wherein the sixth data packet is a data packet transmitted by the UE accessing the integrated access and backhaul node.

In an embodiment of the present disclosure, optionally, header information of the second data packet or header information of the third data packet includes one or more of following combinations: (1) a first mapping relationship between a bearer or channel of the integrated access and backhaul node and a bearer or channel of a downstream integrated access and backhaul node relative to the integrated access and backhaul node and/or a bearer or channel of the UE; (2) a second mapping relationship between a bearer or channel of the integrated access and backhaul node and a bearer or channel of an upstream integrated access and backhaul node relative to the integrated access and backhaul node and/or a bearer or channel of a donor node of the integrated access and backhaul node; (3) a UE identity; (4) a bearer identity or channel identity; (6) QoS information of a bearer or channel; and (6) routing information.

In the following embodiments, a Mobile Terminal (MT) means that: an IAB node accesses a next-level IAB node or an IAB donor node through a UE function of an NR air-interface, which is called an MT function of an IAB node. In the following embodiments, the MT is, for example, MT1, MT2, MT3.

Figure 6:
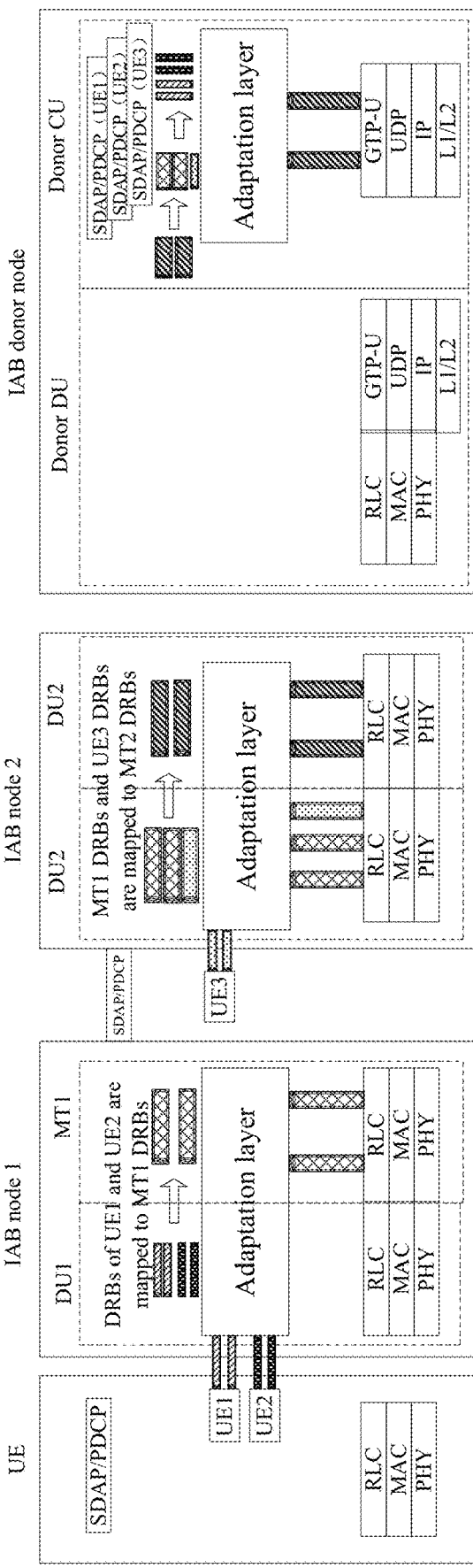
FIG. 6 is a first schematic diagram of transmission of an integrated access and backhaul node according to an embodiment of the present disclosure.

EXAMPLE 1: An Adaptation Layer Does Not Include a GPRS Tunneling Protocol User Plane (GTP-U) Layer Referring to FIG. 6, data of UE1 and UE2 are transmitted to Integrated Access and Backhaul (IAB) node 1, and a distribution unit (DU) of the IAB node 1 recovers Data Radio Bearer (DRB) data (PDCP PDU) of the UE1 and the UE2. An adaptation layer of the IAB node 1 maps the DRBs of the UE1 and the UE2 to DRBs of MT1 and DRBs of an air-interface link of a next-level IAB node according to DRB QoS information of UE1 and UE2, and the adaptation layer transmits data of the MT1 to a next-level IAB node (IAB node 2) according to routing information.

ADU of the IAB node 2 receives the data transmitted by the MT1 and simultaneously receives data transmitted by a new UE (UE3). The DU of the IAB node 2 recovers the data of the MT1 and the data of the UE3. An adaptation layer of the IAB node 2 maps the data of the MT1 and the data of the MT3 to DRBs of an air-interface link of a next-level IAB node, and the adaptation layer transmits the data of the MT1 to the next-level IAB node (IAB donor node) according to the routing information.

A DU of the IAB donor node receives data transmitted by MT2, recovers DRBs of the MT2, and carries the DRBs of the MT2 on an F1 interface between a donor DU and a donor CU (GTP-U/UDP/IP/L1&L2).

A CU of the IAB donor node receives the DRBs of the MT2, the adaptation layer recovers the DRBs of the MT1 and DRBs of the UE3, further recovers the DRBs of the UE1 and the UE2, and transmits the data of the UE1, the UE2 and the UE3 to a corresponding SDAP layer or PDCP layer for processing.

According to the above process, it may be seen that data transmission between a UE and a donor base station is completed through an adaptation layer. The adaptation layer includes header information and payload, and the header information includes the following: (1) a mapping relationship between MT DRBs of a preceding-level IAB node and/or DRBs of an access UE and DRBs of a next-level node towards which preceding-level IAB or the access UE as a MT faces; (2) a UE ID; (3) a DRB ID; (4) DRBs QoS information; (5) routing information.

EXAMPLE 2: Taking Uplink Transmission as an Example

Figure 7:
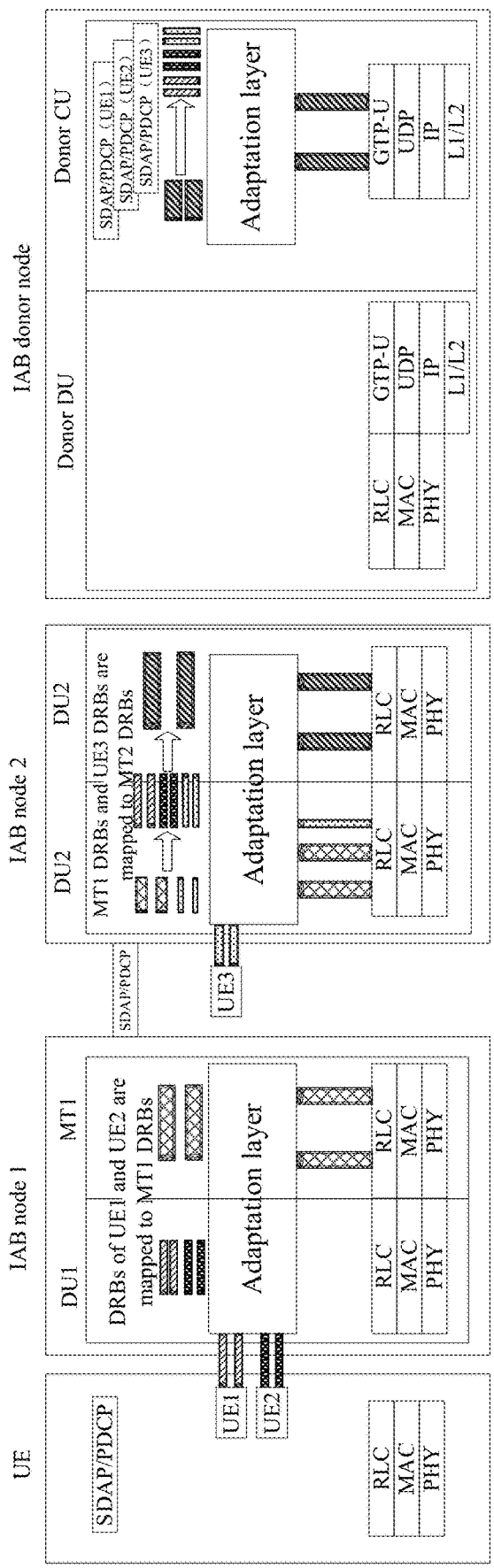
FIG. 7 is a second schematic diagram of transmission of an integrated access and backhaul node according to an embodiment of the present disclosure.

Referring to FIG. 7, data of UE1 and UE2 are transmitted to Integrated Access and Backhaul (IAB) node 1, and a DU of the IAB node 1 recovers DRB data (PDCP PDU) of the UE1 and the UE2. An adaptation layer of the IAB node 1 maps the DRBs of the UE1 and the UE2 to DRBs of MT1 and DRBs of an air-interface link of a next-level IAB node according to DRB QoS information of UE1 and UE2, and the adaptation layer transmits data of the MT1 to the next-level IAB node (IAB node 2) according to routing information.

ADU of the IAB node 2 receives the data transmitted by the MT1 and simultaneously receives data transmitted by a new UE (UE3). The DU of the IAB node 2 recovers the data of the MT1 and the data of the UE3. An adaptation layer of the IAB node 2 recovers DRBs data of the UE1 and the UE2 included in the MT1 and maps the recovered data of the UE1, the UE2 and UE3 to DRBs of an air-interface link of a next-level IAB node, and the adaptation layer transmits data of MT2 to the next-level IAB node (IAB donor node) according to routing information.

A DU of the IAB donor node receives the data transmitted by the MT2, recovers DRBs of the MT2, and carries the DRBs of the MT2 on an F1 interface between a donor DU and a donor CU (GTP-U/UDP/IP/L1&L2).

A CU of the IAB donor node receives the DRBs of the MT2, and the adaptation layer recovers the data of the UE1, the UE2 and the UE3, and transmits the data of the UE1, the UE2 and the UE3 to a corresponding SDAP/PDCP layer for processing.

According to the above process, it may be seen that data transmission between a UE and a donor base station is completed through an adaptation layer. The adaptation layer includes header information and payload, and the header information includes the following: (1) a mapping relationship between MT DRBs of a preceding-level IAB node and/or DRBs of an access UE and DRBs of a next-level node towards which the preceding-level IAB or the access UE faces; (2) a UE ID; (3) a DRB ID; (4) QoS information of DRBs; (5) routing information.

Figure 8:
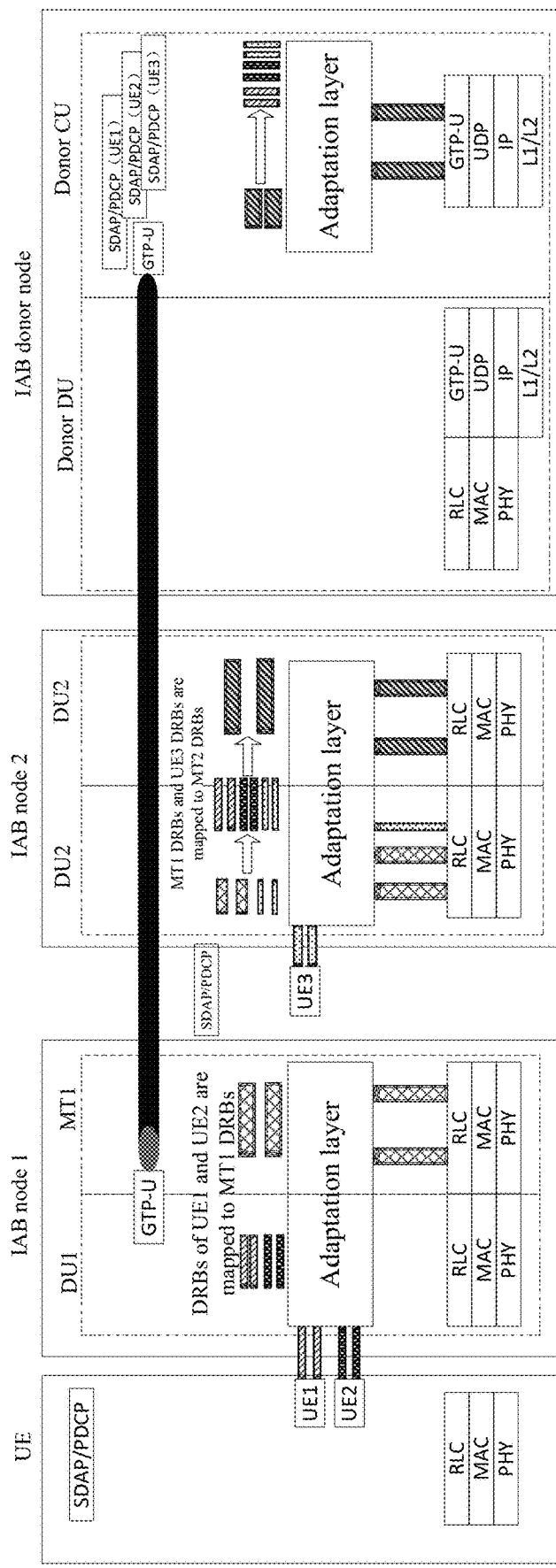
FIG. 8 is a third schematic diagram of transmission of an integrated access and backhaul node according to an embodiment of the present disclosure.

EXAMPLE 3: An Adaptation Layer Includes a GPRS Tunneling Protocol User Plane (GTP-U) Layer Referring to FIG. 8, a process of an adaptation layer including a GTP-U is basically the same as a process of an adaptation layer not including a GTP-U, and a main difference is that a GTP-U tunnel is established between IAB node 1 and a CU of IAB donor node, the donor node may obtain a UE ID and a DRB ID of a UE through a tunnel endpoint identity (Tunnel Endpoint ID, TEID) in a GTP-U header, and the adaptation layer may no longer transmit relevant information.

EXAMPLE 4: A Reordering Function of an Adaptation Layer

In Long Term Evolution (LTE) systems, Internet Protocol (IP) data of a transmitting node is processed by a PDCP layer, a Radio Link Control (RLC) layer, a MAC layer and a Physical (PHY) layer and transmitted to a correspondent node on an air interface, and the correspondent node recovers an IP data packet through a protocol stack reverse to that of the transmitting node. Since an RLC in the LTE has functions of segmentation, concatenation and sorting, the correspondent node may recover PDCP PDUs sequentially. In fifth-generation (5G) mobile communication technology systems, a RLC protocol layer no longer has the sorting function, and the corresponding function is completed in a PDCP layer. Therefore, PDCP PDUs transmitted by a transmitting node may not be recovered in order at a RLC layer of the correspondent node, which allows the IAB node 1 to intelligently recover out-of-order PDCP PDU packets in the above-mentioned New Radio (NR)-based IAB systems, and to continue to transmit the PDCP PDUs to a next-level node, and causes a PDCP layer of the donor IAB node to have a large sorting window, resulting in increased complexity and an increase in transmission delay at the same time.

In an embodiment of the present disclosure, it is proposed that an adaptation layer in IAB should also have a re-sorting function in a PDCP layer, which is processed based on a Serial Number (SN). Specifically, the SN may be implemented in two embodiments.

Manner 1: an adaptation layer adds an individual new SN number, and a correspondent end performs sorting through the SN number.

Manner 2: an adaptation layer re-uses a SN in a PDCP PDU transmitted by a UE.

Figure 9:
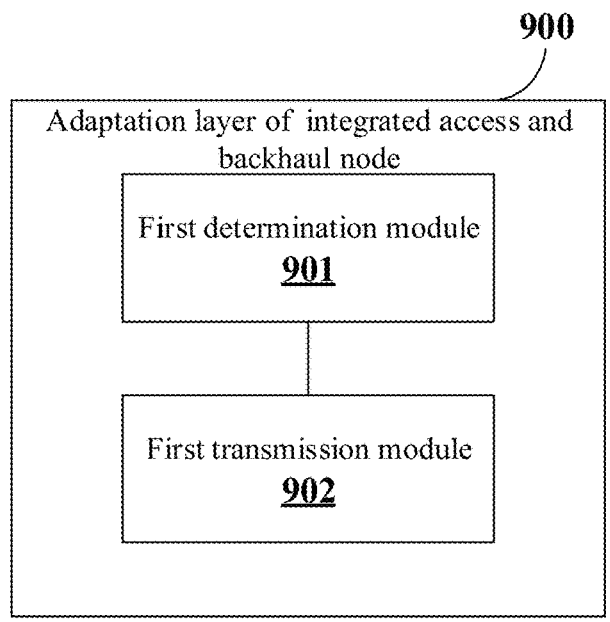
FIG. 9 is a schematic structural diagram of an adaptation layer of an integrated access and backhaul node according to an embodiment of the present disclosure.

Referring to FIG. 9, a structural diagram of an adaptation layer of an integrated access and backhaul node provided in an embodiment of the present disclosure is illustrated, the adaptation layer 900 of the integrated access and backhaul node includes: a first determination module 901, used to determine a first node to which a received first data packet is to be transmitted; a first transmission module 902, used to map the first data packet to a first bearer or channel between the integrated access and backhaul node and the first node.

The first node is one or more downstream integrated access and backhaul nodes relative to the integrated access and backhaul node or a UE accessing the integrated access and backhaul node; or, the first node is one or more upstream integrated access and backhaul nodes relative to the integrated access and backhaul node or a donor node of the integrated access and backhaul node.

In an embodiment of the present disclosure, optionally, the adaptation layer of the integrated access and backhaul node further includes: a recovery module, used to recover data, according to received data and a received serial number, transmitted by a second node, wherein, the second node is one or more downstream integrated access and backhaul nodes relative to the integrated access and backhaul node or a UE accessing the integrated access and backhaul node; or, the second node is one or more upstream integrated access and backhaul nodes relative to the integrated access and backhaul node or a donor node of the integrated access and backhaul node.

In an embodiment of the present disclosure, optionally, the serial number is configured by an adaptation layer of the second node, or the serial number is a reused a PDU serial number in a PDCP PDU transmitted by the UE.

In an embodiment of the present disclosure, optionally, header information of the adaptation layer of the integrated access and backhaul node includes one or more of following combinations: (1) a first mapping relationship between a bearer or channel of the integrated access and backhaul node and a bearer or channel of a downstream integrated access and backhaul node relative to the integrated access and backhaul node and/or a bearer or channel of the UE; (2) a second mapping relationship between a bearer or channel of the integrated access and backhaul node and a bearer or channel of an upstream integrated access and backhaul node relative to the integrated access and backhaul node and/or a bearer or channel of a donor node of the integrated access and backhaul node; (3) a UE identity; (4) a bearer identity or channel identity; (5) Quality of Service (QoS) information of a bearer or channel; and (6) routing information.

Figure 10:
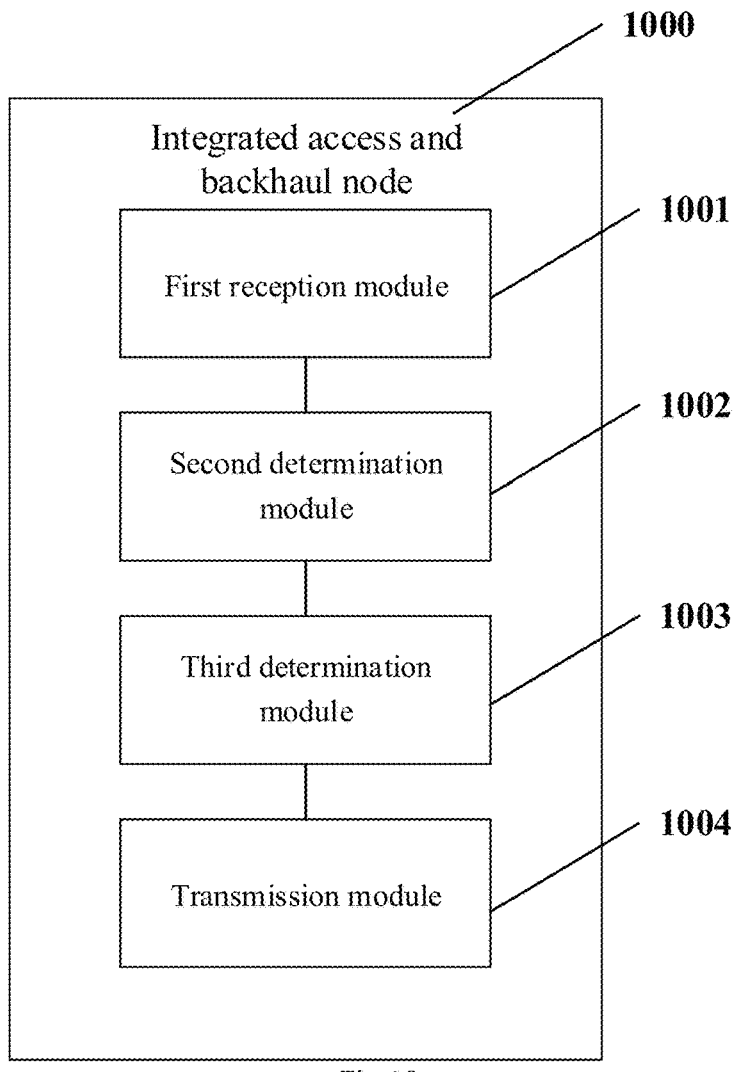
FIG. 10 is a schematic structural diagram of an integrated access and backhaul node according to an embodiment of the present disclosure.

Referring to FIG. 10, a structural diagram of an integrated access and backhaul node provided in an embodiment of the present disclosure is illustrated, the integrated access and backhaul node 1000 includes: a first reception module 1001, used to receive at least one second data packet transmitted by one or more second nodes; a second determination module 1002, used to determine a third data packet according to the second data packet; a third determination module 1003, used to determine a second bearer or channel between the integrated access and backhaul node and a third node; a transmission module 1004, used to transmit the third data packet to the third node over the second bearer or channel.

The second node is a downstream integrated access and backhaul node relative to the integrated access and backhaul node and/or a UE accessing the integrated access and backhaul node, the third node is an upstream integrated access and backhaul node relative to the integrated access and backhaul node or a donor node of the integrated access and backhaul node; or, the second node is an upstream integrated access and backhaul node relative to the integrated access and backhaul node or a donor node of the integrated access and backhaul node, the third node is a downstream integrated access and backhaul node relative to the integrated access and backhaul node and/or a UE accessing the integrated access and backhaul node.

In an embodiment of the present disclosure, optionally, the first reception module is further used to: receive multiple second data units and serial numbers of multiple first data units in the second data packet from the second node; acquire, according to the multiple first data units and the serial numbers, the second data packet transmitted by the second node.

In an embodiment of the present disclosure, optionally, the serial number is configured by an adaptation layer of the second node, or the serial number is a reused Protocol Data Unit (PDU) serial number in a Packet Data Convergence Protocol (PDCP) PDU transmitted by the UE.

In an embodiment of the present disclosure, optionally, the third determination module 1003 is further used to: determine, by the integrated access and backhaul node, the second bearer or channel between the integrated access and backhaul node and the third node according to Quality of Service (QoS) information of bearers of one or more UEs.

In an embodiment of the present disclosure, optionally, the second data packet includes: a fourth data packet and a fifth data packet, wherein the fourth data packet is transmitted by an upstream integrated access and backhaul node relative to the second node or a donor node of the second node or a downstream integrated access and backhaul node relative to the second node, the fifth data packet is transmitted by a UE accessing the second node.

The second determination module is further used to recover the fourth data packet and a sixth data packet according to the second data packet, and map the fourth data packet and the sixth data packet to the third data packet; or recover the fourth data packet, the fifth data packet and the sixth data packet according to the second data packet, map the fourth data packet, the fifth data packet and the sixth data packet to the third data packet.

The sixth data packet is a data packet transmitted by the UE accessing the integrated access and backhaul node.

In an embodiment of the present disclosure, optionally, header information of the second data packet or header information of the third data packet includes one or more of following combinations: (1) a first mapping relationship between a bearer or channel of the integrated access and backhaul node and a bearer or channel of a downstream integrated access and backhaul node relative to the integrated access and backhaul node and/or a bearer or channel of the UE; (2) a second mapping relationship between a bearer or channel of the integrated access and backhaul node and a bearer of an upstream integrated access and backhaul node relative to the integrated access and backhaul node and/or a bearer or channel of a donor node of the integrated access and backhaul node; (3) a UE identity; (4) a bearer identity or channel identity; (5) Quality of Service (QoS) information of a bearer or channel; and (6) routing information.

Figure 11:
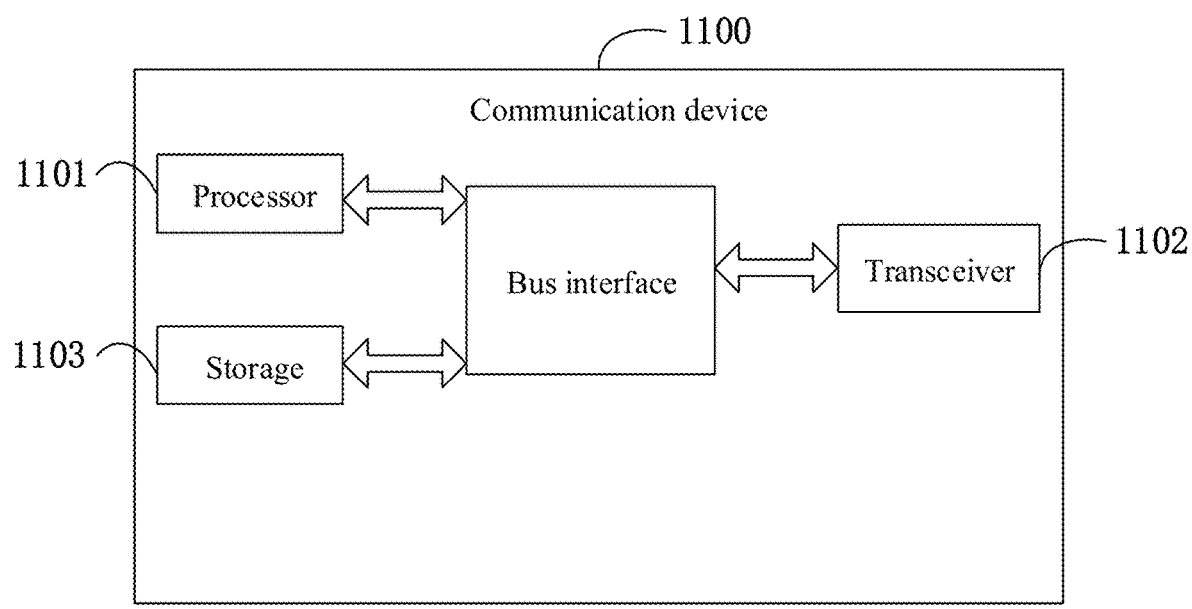
FIG. 11 is a schematic structural diagram of a communication device according to an embodiment of the present disclosure.

Referring to FIG. 11, an embodiment of the present disclosure provides another communication device 1100, the communication device 1100 includes: a processor 1101, a transceiver 1102, a storage 1103, a user interface and a bus interface.

The processor 1101 may be responsible for managing the bus architecture and general processing. The storage 1103 may store data used by the processor 1101 when performing operations.

In an embodiment of the present disclosure, the communication device 1100 further includes: a computer program stored in the storage 1103 and executable by the processor 1101. The computer program is executed by the processor 1101 to implement the steps of the method described above.

In FIG. 11, a bus architecture may include any number of interconnected buses and bridges. Various circuits, specifically, one or more processors represented by the processor 1101 and a storage represented by the storage 1103, are linked together. The bus architecture may also link various other circuits such as peripherals, voltage regulators and power management circuits, which are well known in the art, and therefore embodiments of the present disclosure will not further describe them. The bus interface provides interfaces. The transceiver 1102 may be a plurality of elements, that is, includes a transmitter and a receiver, to provide units configured to communicate with various other devices over a transmission medium.

Steps of the method or algorithm described in connection with the disclosure of the present disclosure may be implemented in a hardware manner, or may be implemented in a manner in which a processor executes software instructions. The software instructions may be composed of corresponding software modules, and the software modules may be stored in a RAM, a flash memory, a ROM, an EPROM, an EEPROM, a register, a hard disk, a mobile hard disk, a read-only optical disk, or any other form of storage medium known in the art. An exemplary storage medium is coupled to the processor, so that the processor may read information from the storage medium and may write information to the storage medium. Of course, the storage medium may also be an integral part of the processor. The processor and the storage medium may be located in an ASIC. In addition, the ASIC may be located in an interface device of a core network. Of course, the processor and the storage medium may also exist as discrete components in an interface device of the core network.

Those skilled in the art should be aware that in one or more of the above examples, functions described in the present disclosure may be implemented by hardware, software, firmware, or any combination thereof. When implemented by software, these functions may be stored in a computer-readable medium or transmitted as one or more instructions or codes on a computer-readable medium. The computer-readable medium includes a computer storage medium and a communication medium, wherein the communication medium includes any medium that facilitates transfer of a computer program from one place to another. The storage medium may be any available medium that may be accessed by a general-purpose computer or a special-purpose computer.

The specific implementations described above are further descriptions of the objectives, technical solutions, and beneficial effects of the present invention in detail. It should be understood that the above descriptions are only specific implementations of the present disclosure, and are not used to limit the protection scope of the present disclosure. Any modification, equivalent replacement, and improvement made on the basis of the technical solutions of the present disclosure should all be included within the protection scope of the present disclosure.

Those skilled in the art will appreciate that an embodiment of the present disclosure may be provided as a method, a system, or a computer program product. Accordingly, an embodiment of the present disclosure may take the form of an entire hardware embodiment, an entire software embodiment, or an embodiment combining software and hardware aspects. Moreover, an embodiment of the present disclosure may use a form of a product of computer programs to be carried out on one or more computer usable storage medium (including but not limit to a magnetic disk memory, a CD-ROM, an optical memory etc.) including computer-executable programming codes.

An embodiment of the present disclosure is described with reference to flowcharts and/or block diagrams of methods, devices (systems) and computer program products according to an embodiment of the disclosure. It will be understood that each flow and/or block of flowcharts and/or block diagrams and a combination of flows and/or blocks in the flowcharts and/or block diagrams may be implemented by computer program instructions. These computer program instructions may be provided to a processor of a general purpose computer, a special purpose computer, an embedded processor or other programmable data processing device to produce a machine, so that the instructions executed by a processor of a computer or other programmable data processing device produce a device for implementing the functions designated in one or more flows of the flowcharts and/or in one or more blocks of the block diagrams.

The computer program instructions may also be stored in a computer readable storage that may direct a computer or other programmable data processing device to operate in a particular manner, such that instructions stored in the computer readable storage produce an article of manufacture including the instruction device, and the instruction device implements the functions designated in one or more flows of the flowcharts and/or in one or more blocks of the block diagrams.

These computer program instructions may also be loaded onto a computer or other programmable data processing device such that a series of operational steps are performed on the computer or other programmable device to produce computer-implemented processing, such that the instructions executed on a computer or other programmable device provide steps for implementing the functions designated in one or more flows of the flowcharts and/or in one or more blocks of the block diagrams.

Obviously, those skilled in the art may make various changes and modifications to embodiments of the present disclosure without departing from spirit and scope of the present disclosure. In this way, if these modifications and variations of embodiments of the present disclosure fall within scope of the claims of the present disclosure and their equivalent technologies, the present disclosure is also intended to include these modifications and variations.

What is claimed is:

1. A processing method of an adaptation layer of an integrated access and backhaul node, comprising:
determining, by the adaptation layer of the integrated access and backhaul node, a first node to which a received first data packet is to be transmitted;
mapping, by the adaptation layer of the integrated access and backhaul node, the first data packet to a first bearer or channel between the integrated access and backhaul node and the first node;
wherein, the first node is one or more downstream integrated access and backhaul nodes relative to the integrated access and backhaul node or a User Equipment (UE) accessing the integrated access and backhaul node; or, the first node is one or more upstream integrated access and backhaul nodes relative to the integrated access and backhaul node or a donor node of the integrated access and backhaul node,
wherein header information of the adaptation layer of the integrated access and backhaul node comprises Quality of Service (QoS) information of a bearer or channel.

2. The processing method of the adaptation layer of the integrated access and backhaul node according to claim 1, further comprising:
recovering, by the adaptation layer of the integrated access and backhaul node, data transmitted by a second node according to received data and a received serial number, wherein, the second node is one or more downstream integrated access and backhaul nodes relative to the integrated access and backhaul node or a UE accessing the integrated access and backhaul node; or, the second node is one or more upstream integrated access and backhaul nodes relative to the integrated access and backhaul node or a donor node of the integrated access and backhaul node.

3. The processing method of the adaptation layer of the integrated access and backhaul node according to claim 2, wherein the serial number is configured by an adaptation layer of the second node, or the serial number is a reused Protocol Data Unit (PDU) serial number in a Packet Data Convergence Protocol (PDCP) PDU transmitted by the UE.

4. The processing method of the adaptation layer of the integrated access and backhaul node according to claim 1, wherein the header information of the adaptation layer of the integrated access and backhaul node further comprises one or more of following combinations:
a first mapping relationship between a bearer or channel of the integrated access and backhaul node and a bearer or channel of a downstream integrated access and backhaul node relative to the integrated access and backhaul node and/or a bearer or channel of the UE;
a second mapping relationship between a bearer or channel of the integrated access and backhaul node and a bearer or channel of an upstream integrated access and backhaul node relative to the integrated access and backhaul node and/or a bearer or channel of a donor node of the integrated access and backhaul node;
a UE identity;
a bearer identity or channel identity;
and
routing information.

5. A communication device, comprising:
a processor, a storage and a computer program stored on the storage and executed by the processor, wherein when the computer program is executed by the processor, the processor implements the steps of the processing method of the adaptation layer of the integrated access and backhaul node according to claim 1.

6. The communication device according to claim 5, wherein when the computer program is executed by the processor, the processor further implements following steps:
recovering, by the adaptation layer of the integrated access and backhaul node, data transmitted by a second node according to received data and a received serial number, wherein, the second node is one or more downstream integrated access and backhaul nodes relative to the integrated access and backhaul node or a UE accessing the integrated access and backhaul node; or, the second node is one or more upstream integrated access and backhaul nodes relative to the integrated access and backhaul node or a donor node of the integrated access and backhaul node.

7. The communication device according to claim 6, wherein the serial number is configured by an adaptation layer of the second node, or the serial number is a reused Protocol Data Unit (PDU) serial number in a Packet Data Convergence Protocol (PDCP) PDU transmitted by the UE.

8. The communication device according to claim 5, wherein the header information of the adaptation layer of the integrated access and backhaul node further comprises one or more of following combinations:
a first mapping relationship between a bearer or channel of the integrated access and backhaul node and a bearer or channel of a downstream integrated access and backhaul node relative to the integrated access and backhaul node and/or a bearer or channel of the UE;
a second mapping relationship between a bearer or channel of the integrated access and backhaul node and a bearer or channel of an upstream integrated access and backhaul node relative to the integrated access and backhaul node and/or a bearer or channel of a donor node of the integrated access and backhaul node;
a UE identity;
a bearer identity or channel identity;
and
routing information.

9. A non-transitory computer readable storage medium storing a computer program, wherein when the computer program is executed by a processor, the processor implements the steps of the processing method of the adaptation layer of the integrated access and backhaul node according to claim 1.

10. A transmission method of an integrated access and backhaul node, comprising:
receiving, by the integrated access and backhaul node, at least one second data packet transmitted by one or more second nodes;
determining, by the integrated access and backhaul node, a third data packet according to the second data packet;
determining, by the integrated access and backhaul node, a second bearer or channel between the integrated access and backhaul node and a third node;
transmitting, by the integrated access and backhaul node, the third data packet to the third node over the second bearer or channel;
wherein, the second node is a downstream integrated access and backhaul node relative to the integrated access and backhaul node and/or a UE accessing the integrated access and backhaul node, the third node is an upstream integrated access and backhaul node relative to the integrated access and backhaul node or a donor node of the integrated access and backhaul node;
or, the second node is an upstream integrated access and backhaul node relative to the integrated access and backhaul node or a donor node of the integrated access and backhaul node, the third node is a downstream integrated access and backhaul node relative to the integrated access and backhaul node and/or a UE accessing the integrated access and backhaul node, wherein header information of the second data packet or header information of the third data packet further comprises Quality of Service (QoS) information of a bearer or channel.

11. The transmission method according to claim 10, wherein determining, by the integrated access and backhaul node, the second bearer or channel between the integrated access and backhaul node and the third node comprises:

determining, by the integrated access and backhaul node, the second bearer or channel between the integrated access and backhaul node and the third node according to Quality of Service (QoS) information of a bearer or channel of one or more UEs.

12. The transmission method according to claim 10, wherein, the second data packet comprises: a fourth data packet and a fifth data packet, wherein the fourth data packet is transmitted by an upstream integrated access and backhaul node relative to the second node or a donor node of the second node or a downstream integrated access and backhaul node relative to the second node, the fifth data packet is transmitted by a UE accessing the second node;

determining, by the integrated access and backhaul node, the third data packet according to the second data packet comprises:

recovering, by the integrated access and backhaul node, the fourth data packet and a sixth data packet according to the second data packet, and mapping, by the integrated access and backhaul node, the fourth data packet and the sixth data packet to the third data packet;

or, recovering, by the integrated access and backhaul node, the fourth data packet, the fifth data packet and the sixth data packet according to the second data packet, and mapping, by the integrated access and backhaul node, the fourth data packet, the fifth data packet and the sixth data packet to the third data packet;

wherein the sixth data packet is a data packet transmitted by the UE accessing the integrated access and backhaul node.

13. The transmission method according to claim 10, wherein the header information of the second data packet or the header information of the third data packet further comprises one or more of following combinations:

a first mapping relationship between a bearer or channel of the integrated access and backhaul node and a bearer or channel of a downstream integrated access and backhaul node relative to the integrated access and backhaul node and/or a bearer or channel of the UE;

a second mapping relationship between a bearer or channel of the integrated access and backhaul node and a bearer or channel of an upstream integrated access and backhaul node relative to the integrated access and backhaul node and/or a bearer or channel of a donor node of the integrated access and backhaul node;

a UE identity;

a bearer identity or channel identity;

and routing information.

14. A communication device, comprising:

a processor, a storage and a computer program stored on the storage and executed by the processor, wherein when the computer program is executed by the processor, the processor implements the steps of the transmission method of the integrated access and backhaul node according to claim 10.

15. The communication device according to claim 14, wherein determining, by the integrated access and backhaul node, the second bearer or channel between the integrated access and backhaul node and the third node comprises:

determining, by the integrated access and backhaul node, the second bearer or channel between the integrated access and backhaul node and the third node according to the Quality of Service (QoS) information of a bearer or channel of one or more UEs.

16. The communication device according to claim 14, wherein, the second data packet comprises: a fourth data packet and a fifth data packet, wherein the fourth data packet is transmitted by an upstream integrated access and backhaul node relative to the second node or a donor node of the second node or a downstream integrated access and backhaul node relative to the second node, the fifth data packet is transmitted by a UE accessing the second node;

determining, by the integrated access and backhaul node, the third data packet according to the second data packet comprises:

recovering, by the integrated access and backhaul node, the fourth data packet and a sixth data packet according to the second data packet, and mapping, by the integrated access and backhaul node, the fourth data packet and the sixth data packet to the third data packet;

or, recovering, by the integrated access and backhaul node, the fourth data packet, the fifth data packet and the sixth data packet according to the second data packet, and mapping, by the integrated access and backhaul node, the fourth data packet, the fifth data packet and the sixth data packet to the third data packet;

wherein the sixth data packet is a data packet transmitted by the UE accessing the integrated access and backhaul node.

17. The communication device according to claim 14, wherein the header information of the second data packet or the header information of the third data packet further comprises one or more of following combinations:

a first mapping relationship between a bearer or channel of the integrated access and backhaul node and a bearer or channel of a downstream integrated access and backhaul node relative to the integrated access and backhaul node and/or a bearer or channel of the UE;

a second mapping relationship between a bearer or channel of the integrated access and backhaul node and a bearer or channel of an upstream integrated access and backhaul node relative to the integrated access and backhaul node and/or a bearer or channel of a donor node of the integrated access and backhaul node;

a UE identity;

a bearer identity or channel identity;

and routing information.

18. A non-transitory computer readable storage medium storing a computer program, wherein when the computer program is executed by a processor, the processor implements the steps of the transmission method of the integrated access and backhaul node according to claim 10.

* * * * *